US012762191B2

(12) United States Patent
Mehra et al.

(10) Patent No.: US 12,762,191 B2
(45) Date of Patent: Oct. 13, 2026

(54) CROSS-APPLICATION COMPONENTIZED DOCUMENT GENERATION

(71) Applicant: Microsoft Technology Licensing, LLC, Redmond, WA (US)

(72) Inventors: Sumit Mehra, Bengaluru (IN); Anish Chandran, Hyderabad (IN); Mukundan Bhoovaraghavan, Hyderabad (IN); Neeraj Kumar Verma, Hyderabad (IN); Srinivasa Chaitanya Kumar Reddy Gopireddy, Hyderabad (IN); Surabhi Bhatnagar, Greater Noida (IN); Soumyadeep Dey, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 17/836,311

(22) Filed: Jun. 9, 2022

(65) Prior Publication Data

US 2023/0401265 A1 Dec. 14, 2023

(51) Int. Cl.

*G06F 16/93* (2019.01)
*G06N 20/00* (2019.01)

(Continued)

(52) U.S. Cl.

CPC ............. *G06F 16/93* (2019.01); *G06N 20/00* (2019.01); *G06V 30/412* (2022.01); *G06V 30/413* (2022.01)

(58) Field of Classification Search

CPC ...... G06F 16/93; G06N 20/00; G06V 30/413; G06V 30/412

See application file for complete search history.

(56) References Cited

U.S. PATENT DOCUMENTS

2016/0078291 A1 3/2016 Kim et al.
2017/0185898 A1 * 6/2017 Paul ...................... G06N 20/00

(Continued)

FOREIGN PATENT DOCUMENTS

WO 2018212822 A1 11/2018

OTHER PUBLICATIONS

"International Search Report and Written Opinion Issued in PCT Application No. PCT/US23/019027", Mailed Date: Jul. 6, 2023, 9 Pages.

(Continued)

*Primary Examiner* — Stephen S Hong
*Assistant Examiner* — Carl E Barnes, Jr.
(74) *Attorney, Agent, or Firm* — Schwegman Lundberg & Woessner, P.A.

(57) ABSTRACT

A method may include presenting content of an electronic document on a mobile computing device within a mobile version of a computing application; classifying, using a set of machine learning models, by the mobile computing device, the content into a plurality of components; after the classifying, highlighting the plurality of components within the mobile version of the computing application; receiving a user input selecting a component of the plurality of components; and adding, by the mobile computing device, the component to a component data store with a type of the component, the type of the component based on output of the set of machine learning models.

20 Claims, 6 Drawing Sheets

(51) Int. Cl.
*G06V 30/412* (2022.01)
*G06V 30/413* (2022.01)

(56) References Cited

U.S. PATENT DOCUMENTS

| | | | | |
|---|---|---|---|---|
| 2018/0189338 | A1* | 7/2018 | Kim | G06F 9/4843 |
| 2018/0225032 | A1* | 8/2018 | Jones | G06F 16/434 |
| 2018/0336415 | A1* | 11/2018 | Anorga | G06N 20/00 |
| 2019/0213393 | A1* | 7/2019 | Liu | G06N 3/063 |
| 2020/0005065 | A1* | 1/2020 | Palm | G06F 3/167 |
| 2022/0027610 | A1* | 1/2022 | Desai | G06V 30/414 |

OTHER PUBLICATIONS

"Automate your Data Extraction", Retrieved from: https://web.archive.org/web/20211012105429/https://www.pdf-tools.com/en/products/pdf-extract/, Oct. 12, 2021, 3 Pages.

Hanumanthappa, et al., "Identification and Extraction of Different Objects and its Location from a Pdf File Using Efficient Information Retrieval Tools", In Proceedings of International Conference on Soft-Computing and Networks Security (ICSNS), Feb. 25, 2015, 6 Pages.

Kapoor, et al., "Climate Change Impacts on Health and Livelihoods: Mongolia Assessment", In Publication of Climate Centre, Apr. 2021, 60 Pages.

Li, et al., "Figure and Caption Extraction from Biomedical Documents", In Journal of Bioinformatics, vol. 35, Issue 21, Apr. 5, 2019, pp. 4381-4388.

Communication under Rule 94(3) Received for European Application No. 23723026.3, mailed on Apr. 10, 2026, 06 pages.

* cited by examiner

CROSS-APPLICATION COMPONENTIZED DOCUMENT GENERATION

BACKGROUND

Small form factor devices (e.g., a smart phone) have a smaller user interface footprint (e.g., their display size) than larger form factor devices (e.g., laptop or desktop computing devices). According, developers often create multiple versions of the same application (sometimes referred to as an app when on smart phones). Each version may be tailored to the type of device. For example, the desktop version of the application may include all the features, whereas a smart phone version may have a reduced feature set. This may make creating or editing documents on the smart phone version more difficult than the desktop version.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
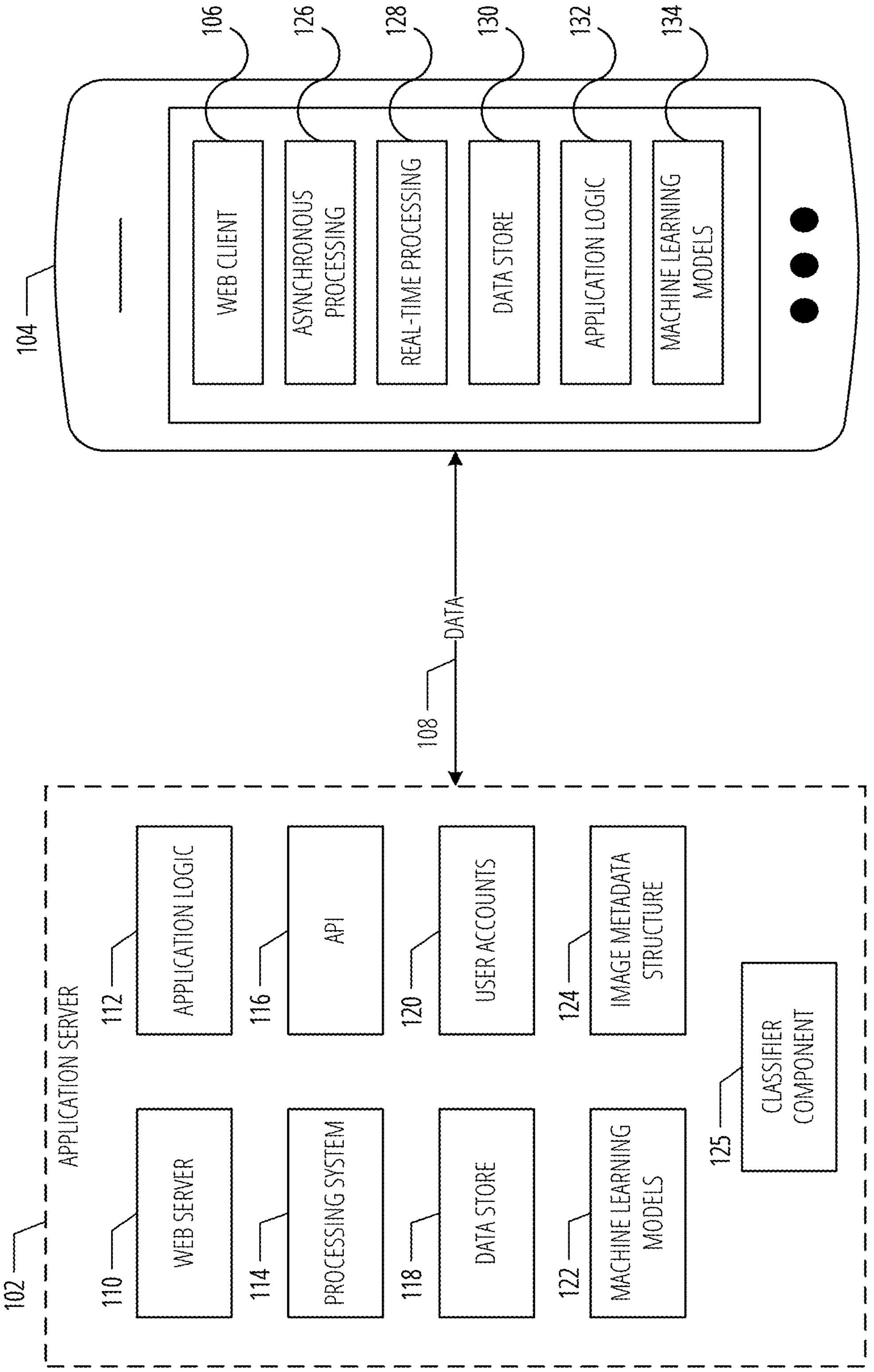
FIG. 1 is an illustration of components of a client device and an application server, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include transmitting data (e.g., a hypertext markup language file) from a first device (such as a web server) to the computing device for rendering on a display device of the computing device via a rendering engine such as a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of “presenting a user interface” does not infer either one of these options.

Additionally, the elements and portions are sometimes described as being configured for a certain purpose. For example, an input element may be described as being configured to receive an input string. In this context, “configured to” may mean presentation of a user interface element that is capable of receiving user input. Thus, the input element may be an empty text box or a drop-down menu, among others. “Configured to” may additionally mean computer executable code processes interactions with the element/portion based on an event handler. Thus, a “search” button element may be configured to pass text received in the input element to a search routine that formats and executes a structured query language (SQL) query with respect to a database.

As indicated in the Background section, small form factor devices are often at a disadvantage with respect to document creation. One physical constraint of the small form factor devices is the screen itself. Thus, even if an application includes all of the features, it is likely not possible to display controls (e.g., icons) to use all of the features without requiring navigating to multiple screens. Additionally, much of a document that is presented on a small form factor device is obstructed when the feature controls are displayed. Also, selecting items on a small screen size is often difficult because a user’s finger is not capable of the precision of an input device such as a mouse.

Additionally, small form factor devices often have technical limitations that larger devices do not. For example, even though smart phones have become faster and have more working memory (e.g., random access memory), their desktop counterparts have as well. Accordingly, for machine learning tasks such as natural language processing of audio data, computer vision tasks for classification, etc., a desktop computer will be able to perform the same task faster.

Furthermore, many machine learning tasks are performed by shared-computing infrastructure in a “cloud” environment (e.g., MICROSOFT AZURE® or AMAZON EC2®). The use of shared-computing infrastructure has numerous benefits such as increased processing speed and providing new features/updates to machine learning model without requiring any changes to the client device (e.g., the smart phone or desktop computer). Shared-computing infrastructure also provides a location for centrally managing user data such as user preferences and data storage for documents of a user. For example, a user may create a document on one device and edit it on a separate device.

Described herein are systems and methods for improving small form factor devices by adding the ability to leverage aspects of a document—created in one application type on a large form factor device—for document generation on the small form factor device in a second application type. As discussed in further detail below, this is accomplished by an image analysis process that transforms regions of the presented content into components. These components may then be stored in a gallery data store for use in a new document on the small form factor device.

FIG. 1 is an illustration of components of a client device and an application server, according to various examples. FIG. 1 includes application server 102, client device 104, web client 106, data 108, web server 110, application logic 112, processing system 114, application programming interface (API 116), data store 118, user accounts 120, machine learning models 122, image metadata structure 124, classifier component 125, asynchronous processing 126, real time processing 128, data store 130, application logic 132, machine learning models 134.

Application server 102 is illustrated as set of separate elements (e.g., component, logic, etc.). However, the functionality of multiple, individual elements may be performed by a single element. An element may represent computer program code that is executable by processing system 114. The program code may be stored on a storage device (e.g., data store 118) and loaded into a memory of the processing system 114 for execution. Portions of the program code may be executed in a parallel across multiple processing units (e.g., a core of a general purpose computer processor, a graphical processing unit, an application specific integrated circuit, etc.) of processing system 114. Execution of the code may be performed on a single device or distributed across multiple devices. In some examples, the program code may be executed on a cloud platform (e.g., MICROSOFT AZURE® and AMAZON EC2®) using shared computing infrastructure.

Client device 104 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device. As with client device 104, the functionality of multiple, individual elements depicted as part of client device 104 may be performed by a single element and executed in a number of different manners.

Client device 104 and application server 102 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet. Client device 104 and application server 102 may communicate data 108 over the network. Data 108 may include documents created by a user, edits made by a user, classification of regions of an image, among others as discussed in more detail below.

In some examples, the communication may occur using an application programming interface (API) such as API 116. An API provides a method for computing processes to exchange data. A web-based API (e.g., API 116) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 118 or data store 130).

API 116 may also define calls to invoke processing of a component of application server 102 or client device 104. For example, client device 104 may use an API call to process currently displayed image data on client device 104 via classifier component 125 on application server 102.

APIs may also be defined in frameworks provided by an operating system (OS) on client device 104 to access data in an application that an application may not regularly be permitted to access. For example, the OS may define an API call to access data that is currently displayed on a mobile device for processing by application server 102 or to access biometric authentication methodologies using a data stored in a secure element of client device 104.

Application server 102 may include web server 110 to enable data exchanges with client device 104 via web client 106. Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page that is rendered on a display device of a client device (e.g., a mobile phone, desktop computer, etc.).

Additionally, web server 110 may enable a user to interact with one or more web applications provided in a transmitted web page. A web application may provide user interface (UI) components that are rendered on a display device of client device 104. The user may interact (e.g., select, move, enter text into) with the UI components, and, based on the interaction, the web application may update one or more portions of the web page. A web application may be executed in whole, or in part, locally on client device 104. The web application may populate the UI components with data from external sources or internal sources (e.g., data store 118) in various examples.

Web server 110 may also be used to respond to data calls made from a native application or app running on a client device. For example, client device 104 may have a productivity app that includes word processing functionality, and a user may wish to open a document that is stored within data store 118. As the user edits the document, any changes made by the user may be synced back to application server 102 using web server 110.

In various examples, the web application provides functionality to applications running on client device 104. For convenience, the web application is described as a single application, but may be multiple applications. The functionality may include processing image data transmitted by client device 104 into a series of components, storing components of a document that have been selected by the user on application server 102, serving the stored components, and maintaining a network-enabled document store of documents associated with the user. The functionality is described in further detail with respect to the other elements and figures.

The web application may be executed according to application logic 112. Application logic 112 may use the various elements of application server 102 to implement the web application. For example, application logic 112 may issue API calls to retrieve or store data from data store 118 and transmit it for display on client device 104. Similarly, data entered by a user into a UI component may be transmitted back to web server 110 using API 116. Application logic 112 may use other elements (e.g., machine learning models 122, image metadata structure 124, and classifier component 125) of application server 102 to perform functionality associated with the web application as described further herein.

Application logic 132 may include code that configures a processing unit (not shown) of client device 104 to perform the functionality described herein. For example, application logic 132 may be an app that is a suite of applications for document creation/editing. The suite may include a word processing application, a presentation application, a spreadsheet application, etc. In various examples, each of the applications in the suite is a mobile version of the application. Thus, the word processing application on client device 104 may only include a subset of the features available on the full featured desktop version of the application. For example, the mobile version of the word processing application may not be able to inset a table of contents, or the mobile version of the spreadsheet may not be able to insert pivot tables.

Data store 118 may store data that is used by application server 102. Data store 118 (as well as data store 130) is depicted as singular element, but may in actuality be multiple data stores. The specific storage layout and model used in by data store 118 may take a number of forms—indeed, a data store 118 may utilize multiple models. Data store 118 may be, but is not limited to, a relational database (e.g., SQL), non-relational database (NoSQL) a flat file database, object model, document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and may be located in one or more geographic areas.

Data store 118 may store documents that have been created or shared with a user on a client device. For example, a user may create a document on one client device, which is synced to data store 118 via API 116. The user may then access the same document on a separate client device in which any modifications to the document are synced back to data store 118. A web-based version of a document editor may also be served by application server 102 to access/modify the document. Additionally, data store 118 may store a component gallery of components that have been selected by a user on client device 104 as discussed in further detail below.

Data store 130 may store local version of documents that are stored in data store 118. For example, even with no network connection, a user may edit a document using an app client device 104. Then, when a network connection is reestablished, changes made to the document may be transmitted to application server 102. Similarly, if changes have been made to the document on a different client device, the local version of the document may be updated.

User accounts 120 may include user profiles of users of application server 102. A user profile may include credential information such as a username and hash of a password. A user may enter in their username and plaintext password to a login page of application server 102 to view their user profile information or interfaces presented by application server 102 in various examples.

A user account may be associated with a set of documents stored in data store 118. Associated may mean an entry in a database exists that links a user identifier of the user to a document identifier. The entry may further indicate the nature of the association. For example, a user may have read/write access to a document or just read access.

A two-stage analysis may be implemented by application server 102 and client device 104 to determine components that are presented on a display device of client device 104. The analysis may use machine learning models 122, image metadata structure 124, classifier component 125, asynchronous processing 126, real time processing 128, and machine learning models 134, in various examples.

Classifier component 125 takes, as input, an image capture from client device 104. The image capture may be the result of transforming presented content into a screen shot. For example, client device 104 may be executing a document viewing application, and periodically (e.g., every 10 seconds) application logic 132 may take a screen capture of the displayed content and transmit it to application server 102 for classification of parts of the image. Classifier component 125 may make use of machine learning models 122 to process the received image in several ways. For example, machine learning models 122 may have two sets of machine learning models: a set of document processors and a set of non-document processors.

The document processors may include a region segmentation model that has several region analyzers (e.g., computer vision models such as recurrent neural networks) such as an image segmentation model, a chart extraction model, a text extraction model, a diagram extraction model, a table extraction model, and a text entity (e.g., hyperlink) extraction model. The non-document processor may include an image tagging model, an object detection model, a person segmentation model, and a face detection model.

The output of classifier component 125 may be a metadata file that indicates the highest probability components and their locations within the image. For example, each of the region analyzers may be run against each region identified by the region segmentation model. The analyzer with the highest probability may be determined to be the component type for the region. For example, the chart extraction model may output a 98% probability that a region is a chart, and the text extraction model may output a 92% probability that the region is text. Thus, that region may be classified as a chart component. There may also be a minimum probability level that is required before a region is classified as any type of object.

The metadata file may be a structured data file such as a JavaScript object notation (JSON) file or extensible markup language (XML) file. The entries within the file may indicate the type of component (e.g., a chart, text, etc.) and the pixel coordinates within the image that bound the component. The metadata file may be associated (e.g., as a sidecar file) with the original image that was received for analysis and stored in data store 118. Accordingly, any application that then uses the image may access the image metadata and how to handle presentation of the identified components.

Asynchronous processing 126, real time processing 128, and machine learning models 134 may also be used to classify components in an image. Machine learning models 134 may include a subset or variations of the region analyzers of machine learning models 122. For example, machine learning models 134 may include, as part of asynchronous processing 126, a text extraction model, an image segmentation model, a region segmentation model, and a table detection model but not include a chart extraction model or diagram extraction model. The text extraction model of machine learning models 134 may only be able to detect a limited number of languages—whereas the text model of machine learning models 122 may be able to recognize text in any language. In various examples, the region segmentation model of machine learning models 122 may segment an image into smaller segments than the region segmentation model of machine learning models 134.

Real time processing 128 may include a classifier that invokes the analyzers of the asynchronous processing 126 based on a document detector model indicating a document is being presented on the display device of client device 104. A document may originate from a photo captured by a camera of client device 104, a screenshot taken by the user, a previously taken photo, a still of a video, or a portable document format (PDF) file, in various examples.

The first stage of the two-stage analysis may be—while a file is open on client device 104—for the classifier of real time processing 128 to invoke the analyzers of machine learning models 134 of the displayed contents of the file or an image file that is the result of a PDF to image conversion.

The second stage of the analysis may be performed at application server 102. The analysis at application server 102 may take as input the file or image file transmitted from client device 104. The transmission may occur after each of the analyzers of machine learning models 134 has been completed or occur simultaneously with machine learning models 134 executing.

In various examples, the results of the first stage may be completed before the second stage. The results of the first stage may be stored as metadata associated with the image file and transmitted to application server 102 for storage. The results of the analyzers of machine learning models 122 may take precedence over machine learning models 134. Accordingly, if the machine learning models 134 indicate a portion of the image is a table, but machine learning models 122 indicate the portion is a chart, a chart type component may be stored as the metadata.

Figure 2:
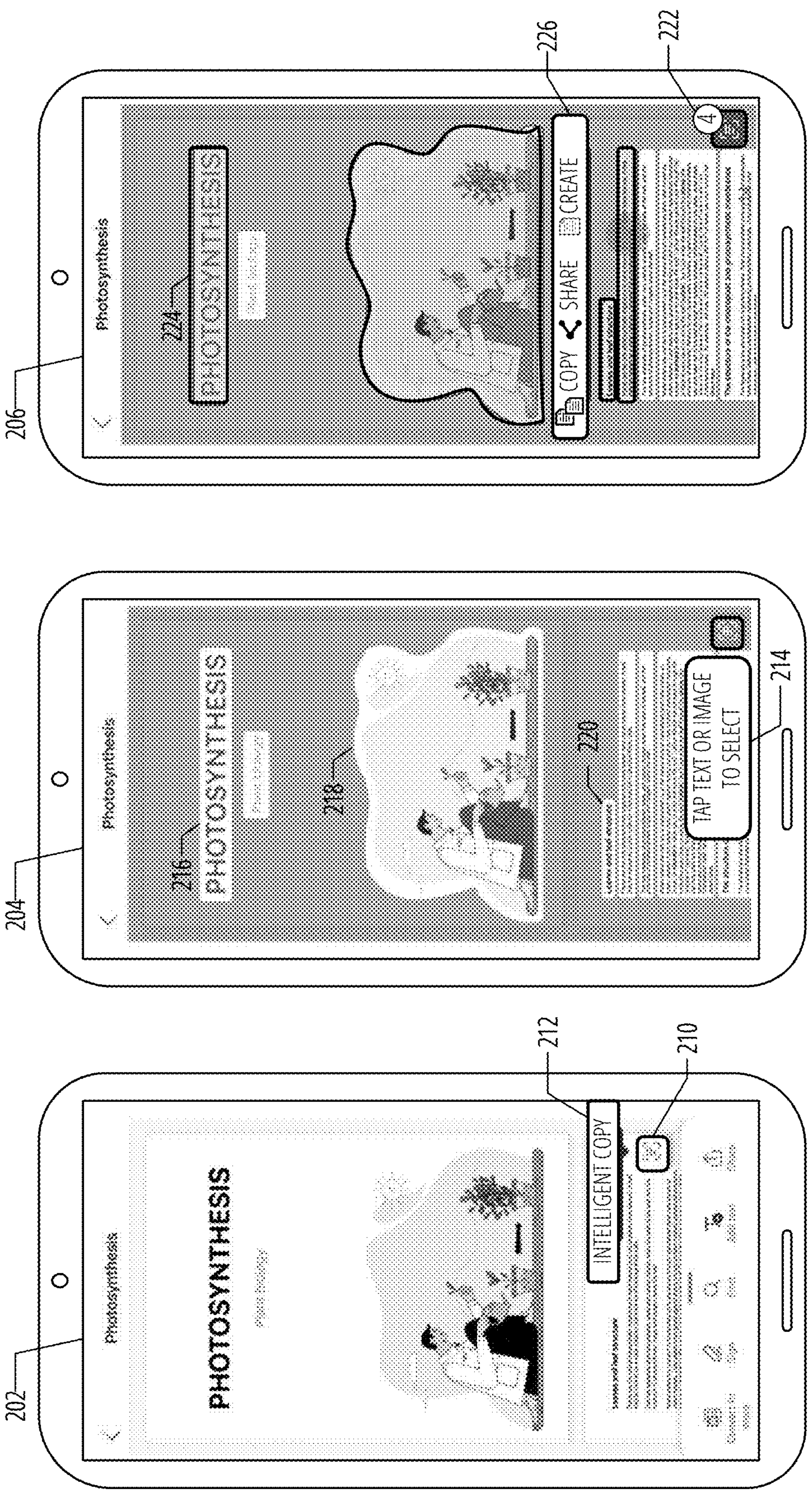
FIG. 2 is a screenshot workflow of selecting detected components in a document, according to various examples.

FIG. 2 is a screenshot workflow of selecting detected components in a document, according to various examples. FIG. 2 includes an example progression from a screenshot 202 to a screenshot 204 to a screenshot 206 presented on a mobile client device (e.g., a smart phone such as client device 104). Screenshot 202 may represent a user viewing a PDF that was attached in an email. Screenshot 202 further includes an intelligent copy icon 210 and text legend 212 that may be presented when a user hovers over intelligent copy icon 210.

In various examples, intelligent copy icon 210 may only be shown if a document detector model—as part of machine learning models 134 or 122—indicates a high probability (e.g., above 98%) that the user is viewing a document and components have already been detected. For example, the two-stage analysis discussed above with respect to FIG. 1 may result in an image metadata file that is transmitted to client device 104 from application server 102 as part of a processed image version of the PDF or image capture of the presented content. The metadata may indicate the components detected, the types of components, and the locations of the components. Thus, if there is at least one component detected, intelligent copy icon 210 may be presented to the user. In other examples, a client device may postpone any component analysis of the document until a user activates (e.g., clicks) intelligent copy icon 210 at which point the two-stage analysis of the presented content may be initiated.

In various examples, the document detector model (and other machine learning models) may be used across, or separate, from the document viewing application. For example, a user may be using a camera application. If the document detector model detects a document within the field of view, an outline around the document may be presented in real time within the viewfinder (e.g., the display) as the user moves their smart phone around. After a user captures the image, the document may be further analyzed for components using the region analyzers described above.

Screenshot 204 may be the result of a user activating intelligent copy icon 210. As the various regional analyzers complete, the user interface may be updated to highlight the detected components. Highlighting may include darkening the screen except for where components have been detected. Because machine learning models 134 may complete before machine learning models 122 it is possible that the interface presents outlines of some initial components detected by machine learning models 134 and then adds (or changes existing detected components) based on the result of machine learning models 122.

In various examples, client device 104 processes the metadata file to indicate the locations of the components and highlights (e.g., using different colors, etc.) them accordingly. For example, within screenshot 204, text component 216, image component 218, and text component 220 are presented as brighter than portions of the interface that do not have components. Text label 214 may present instructions on how to select one of the presented components. A user may also select more than component by holding a pointer device (e.g., their finger on a touch screen) for a threshold amount of time on a component.

Screenshot 206 may be presented after the user has selected four different components that were presented in screenshot 204. Screenshot 206 includes selected component element 222 that numerically indicates how many components were selected by the user. A selected component may include a further style enhancement beyond a non-selected component. For example, the component may include a bold outline such as depicted as outline 224 around text component 216.

Control elements 226 may be presented after a user has selected at least one component. The three presented elements are for example purposes and more or fewer elements may be presented without departing from the scope of this disclosure. In this instance, a copy element, a share element, and a create element are included. In various examples, regardless of the control element selected, the selected components may be added to a component gallery that is stored as part of the user's account on application server 102.

The components are not just stored as images. Instead, the components are stored as the type of element that was detected by the analyzers. For example, if a table is detected, the gallery data store will store the component as a table that, once placed into a new document, is editable as a table. Similarly, if a chart has been detected, a user may manipulate the chart as if it was a chart once it is added into a new document (e.g., switch from a bar chart to a column chart). When the type is an image, the image may be stored crop downed to the outline of the image—as opposed to a rectangle that may include a portion of the display that is not related to the image.

The sharing element may be used to share the component to another user. Sharing may include granting an access right to a portion of the sharer's component gallery to the sharee (e.g., the person to which the sharer is sharing with). A user may also create a new document based on the selected components as discussed below with respect to FIG. 3. In another example, sharing may include placing the component in a message for transmission to another user (e.g., within an e-mail, text message, or other messaging application).

Figure 3:
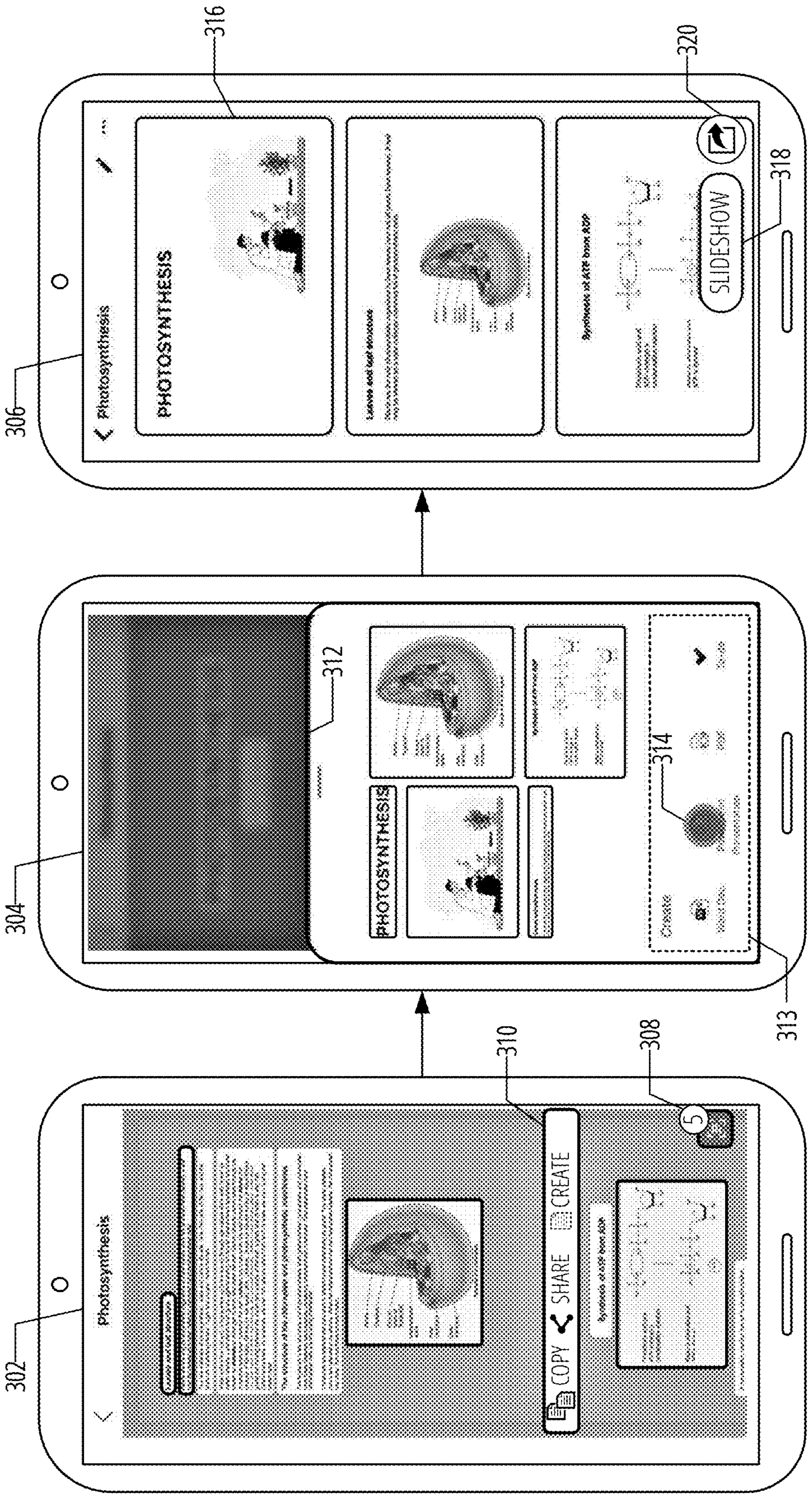
FIG. 3 is a screenshot workflow of creating a document using saved components, according to various examples.

FIG. 3 is a screenshot workflow of creating a document using saved components, according to various examples. FIG. 3 includes an example progression from a screenshot 302 to a screenshot 304 to a screenshot 306 presented on a mobile client device (e.g., a smart phone such as client device 104).

Screenshot 302 indicates that, according to selected component element 308, five components have been selected. The five elements are identified in screenshot 302 by their bolded outlines. Additionally, screenshot 302 includes control elements 310. As seen, there are only four outlines present in screenshot 302. Because the document presented is a PDF, not all of elements are in the currently viewable portion of the PDF.

Screenshot 304 may be presented after a user has selected the create element of control elements 310. Screenshot shows an overlay slide-up interface 312 that includes representations of the components that were previously selected by the user. Additionally, a document type selection portion 313 includes links to create different types of documents using the selected components. For example, presentation element 314 may be used to generate a presentation document using the components.

The overlay slide-up interface 312 is illustrated as presenting the most recent five components selected according to screenshot 302; however, the interface may be configured to include past components. For example, overlay slide-up interface 312 may include all components of the user's component gallery. Overlay slide-up interface 312 may include filtering controls for selecting a type of component or sorting according to originating document or capture date, in various examples.

Screenshot 306 depicts a presentation document that was created based on the components of overlay slide-up interface 312. In various examples, a user may place each component one-by-one. For example, the user may use a swipe up gesture to display their component gallery and drag-and-drop each component onto a new slide (e.g., slide 316). In various examples, application logic 132 may automatically arrange the components in the new document. For example, the components may be placed according to their location in the original document. In various examples, each component may be placed on a single slide. A user may edit their preferences related to the automatic placement of components, in various examples.

As indicated above, the components, once added to the new document are objects of the detected type. Thus, if the text extraction model indicates a portion of the analyzed image is text, the component placed into a slide is editable as a text object. Upon completion of the presentation, a user may present the slides using slideshow control 318 or share the presentation (e.g., to other users or a data store) using share control 320.

Figure 4:
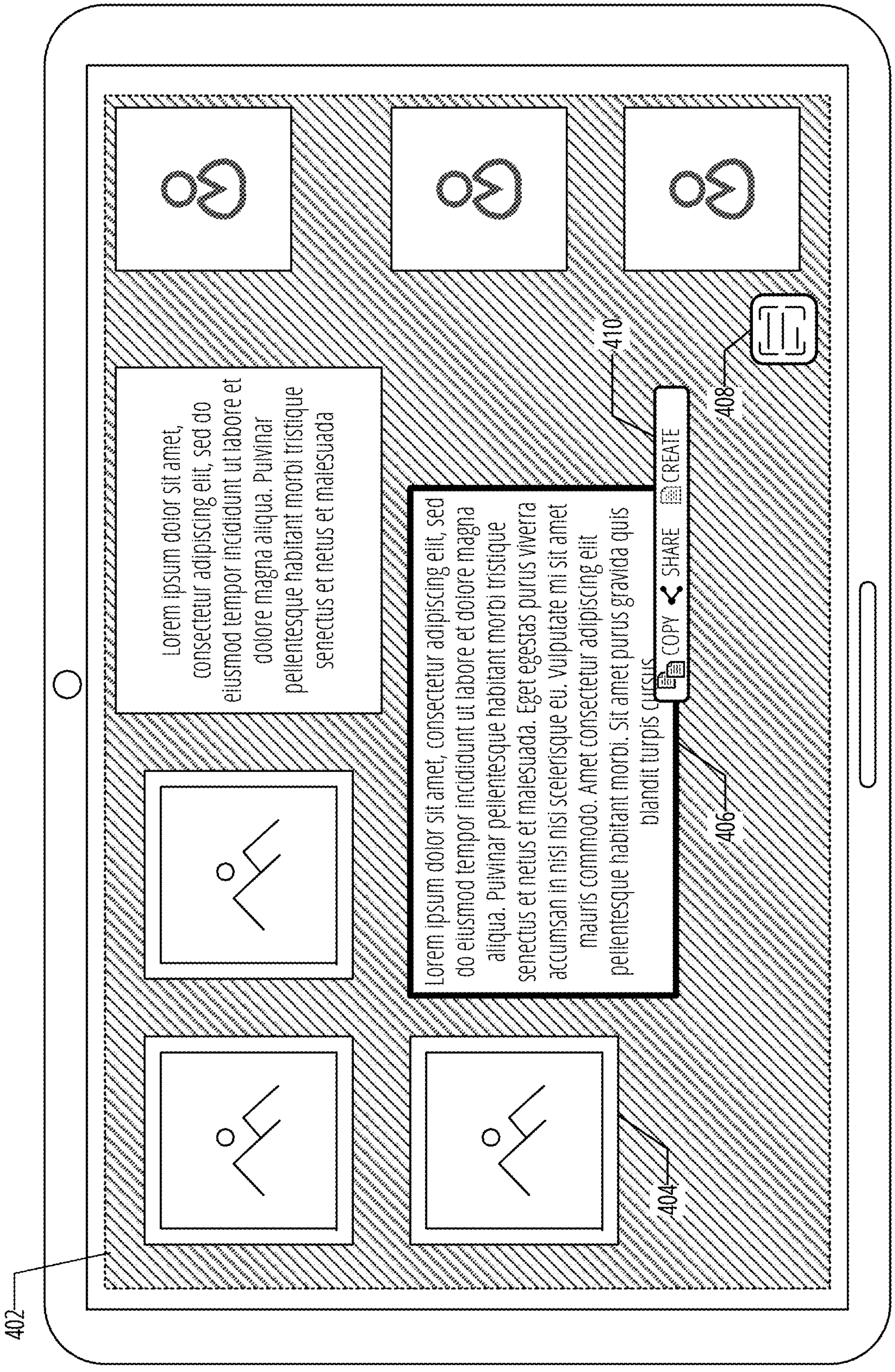
FIG. 4 is a screenshot of component detection of a paused video, according to various examples.

FIG. 4 is a screenshot 402 of component detection of a paused video, according to various examples. Screenshot 402 may be based on a user watching a video recording of an online meeting. Often one or more users will share content during the video, but the underlying content is not always made available to the viewers. While watching playback of the video a user may pause the video and a screenshot of the currently displayed frame may be analyzed in a similar fashion as the PDF example of FIG. 2.

In this case, the analysis has revealed eight components, which are outlined in FIG. 4. The remaining content is obscured (represented by the diagonal lines) to allow the user to better visualize the detected components. A user may have activated intelligent copy icon 408 and selected text component 406. The result of the selection may cause control elements 410 to be presented. Additionally, the selection may cause a further bolding of the outline of selected text component 406 to be used as opposed to a regular width outline of the other components (e.g., image component 404).

Figure 5:
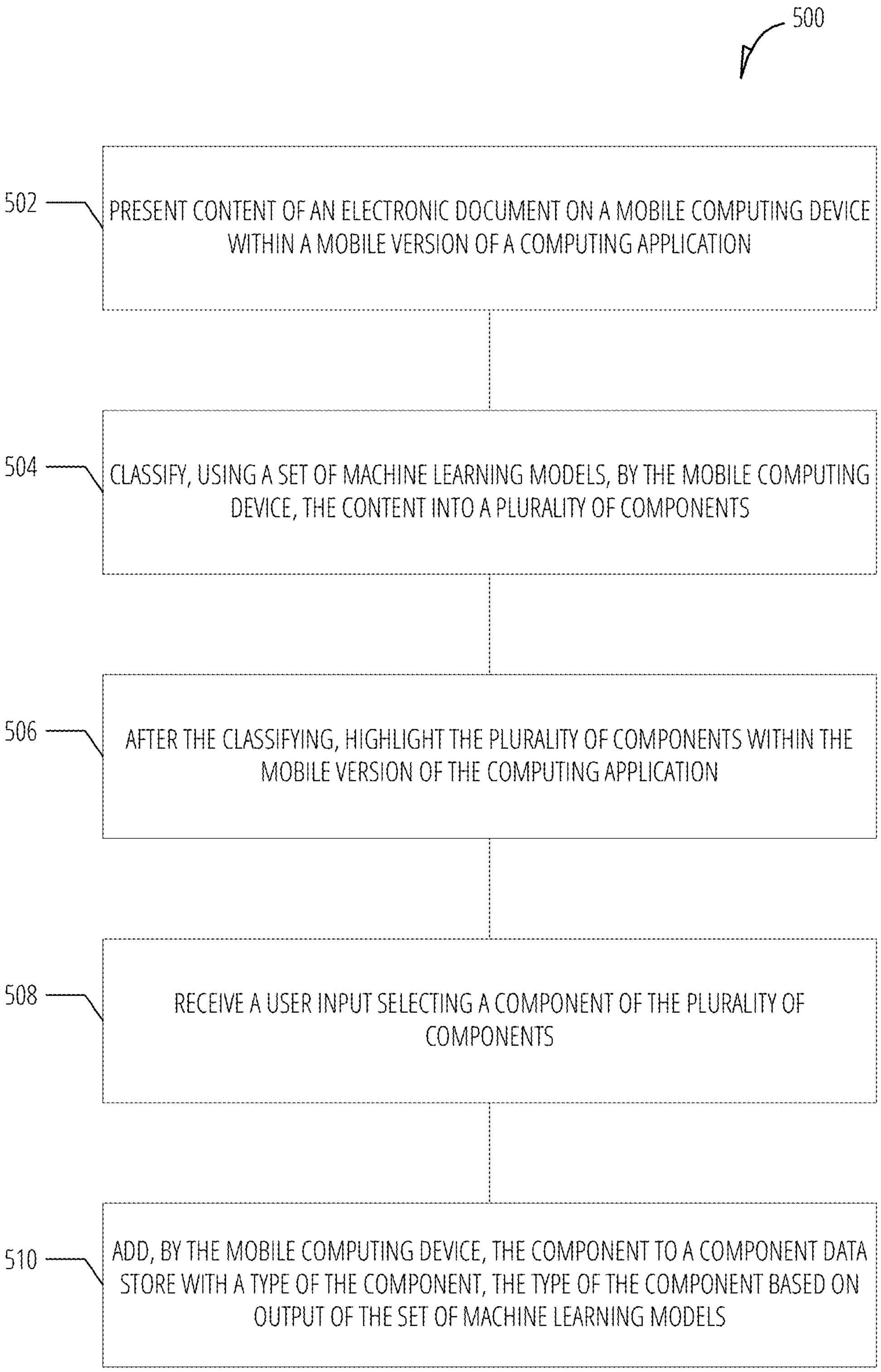
FIG. 5 is a flowchart diagram illustrating method operations to store detected components of a document.

FIG. 5 is a flowchart diagram illustrating method operations to store detected components of a document. The method is represented as a set of blocks that describe operation 502 to operation 510 of method 500. The method may be embodied in a set of instructions stored in at least one computer-readable storage device of a computing device (s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In an aspect, the method includes operation 502 for presenting content of an electronic document on a mobile computing device within a mobile version of a computing application. The mobile computing device may be a device such as client device 104. The electronic document may be a PDF in various examples. The mobile version of the computing application may be a reduced feature set version of a desktop version of the application in various examples.

In an aspect, the method includes operation 504 for classifying, using a set of machine learning models, by the mobile computing device, the presented content into a plurality of components (e.g., a first component of a text element type and a second component with an image component type). The set of machine learning models may be machine learning models 134. Classifying the content may first include transforming the presented content into an image file (e.g., such as by a screen capture) and inputting the image file into the set of machine learning models.

In an aspect, the method includes operation 506 for after the classifying, highlighting the plurality of components within the mobile version of the computing application. Highlighting may include reducing the hue/saturation/tone of elements of the content that were not identified as components or adding a border to identified components.

The method may also include receiving, from a server device a second classifying from a second set of machine learning models of the presented content into a second plurality of components and updating the highlighting based on the second classifying. For example, the second set of machine learning models may be machine learning models 122 and be received from application server 102. Updating may include highlighting additional elements of the presented content.

In an aspect, the method includes operation 508 for receiving a user input selecting a component of the plurality of components. Selecting may include a user using an input device such as a touchscreen of the mobile computing device.

In an aspect, the method includes operation 510 for adding, by the mobile computing device, the component to a component data store with a type of the component where the type of the component is based on output of the set of machine learning models. For example, the type may be determined based on classifier component 125. The component data store may be associated with the user and stored in data store 118 or data store 130.

The method may also include further includes overlaying on the presented content, an intelligent copy element (e.g., intelligent copy icon 210) and receiving a selection of the intelligent copy element. In example, the highlighting of operation 506 may occur in response to the selection. In response to receiving the user input selecting the second component the intelligent copy element may be updated to indicate two components were selected (e.g., display selected component element 222).

The method may also include overlaying on the presented content a set of control elements (e.g., control elements 226) with respect to the first component and the second component. A selection of a document creation control element of the set of control elements may be received. The method may include, in response to receiving the selection of the document creation control element, presenting a set of document types (e.g., document type selection portion 313).

The method may also include in response to a selection of a document type of the set of document types generating a new document of the document type, and presenting representations of the first component and second component in a selection interface (e.g., overlay slide-up interface 312).

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium.

In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
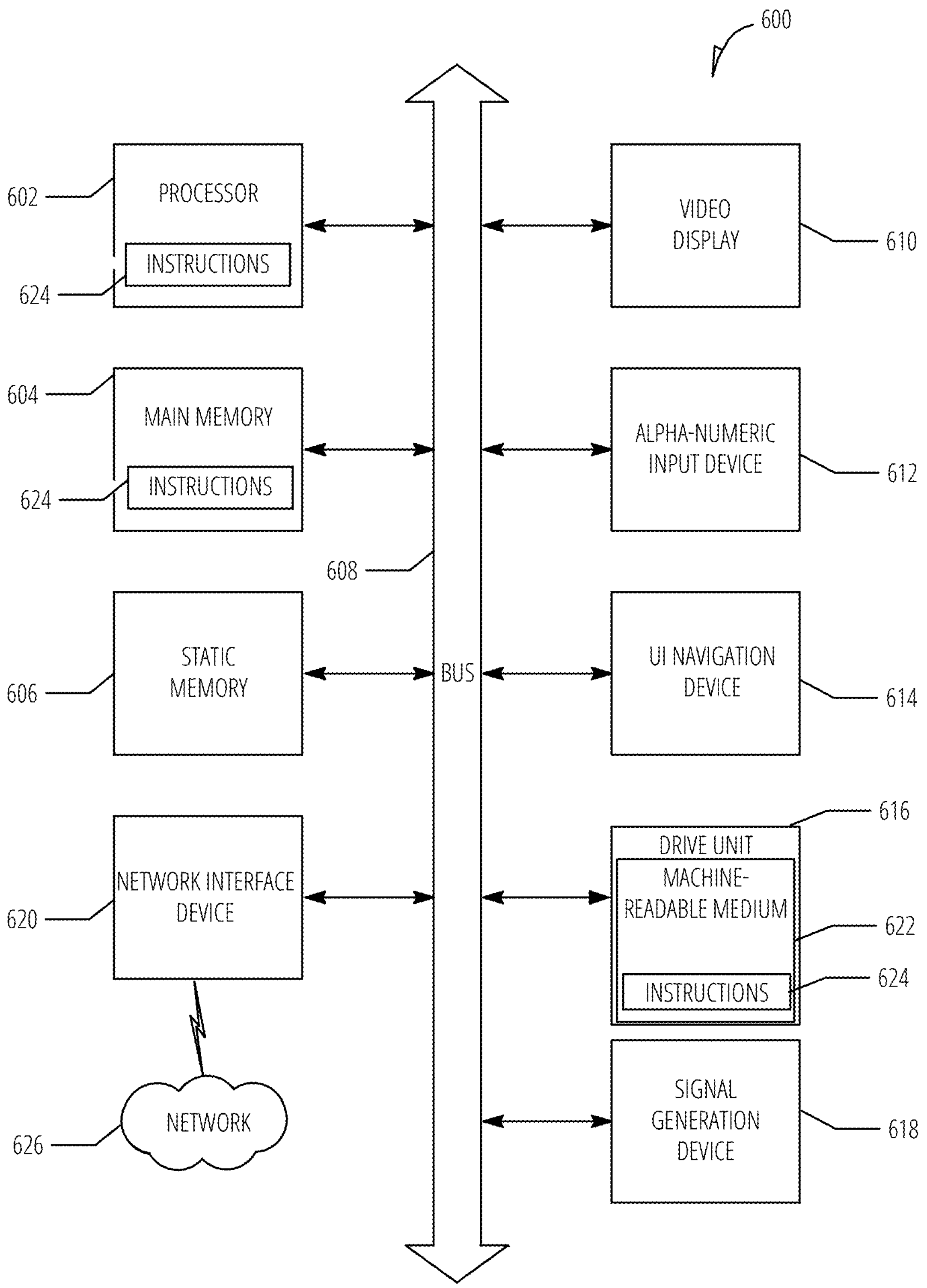
FIG. 6 is a block diagram illustrating an example machine upon which any one or more of the techniques (e.g., methodologies) discussed herein may be performed, according to various examples.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the at least one processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, 4G LTE/LTE-A or WiMAX networks, and 5G). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:

presenting content of an electronic document on a mobile computing device within a mobile version of a computing application;

classifying, using a first set of machine learning models, by the mobile computing device, the content into a plurality of components;

generating, at the mobile computing device, metadata based on the classifying the content into the plurality of components;

transmitting the metadata to a server having a second set of machine learning models, results of the server taking precedence over the results of the mobile computing device in the metadata;

after the classifying, highlighting the plurality of components within the mobile version of the computing application;

receiving, from the server, a second classifying from the second set of machine learning models of the presented content into a second plurality of components;

updating the highlighting based on the second classifying;

surfacing, within the mobile version of the computing application, an intelligent-copy element that is selectable by a user;

receiving a user selection of the intelligent-copy element;

in response to the selection, presenting on the mobile version of the computing application an overlay slide-up interface that includes selectable options to create a presentation document or a word processing document using one or more selected components;

receiving a user selection of one of the selectable options;

receiving a user input selecting a component of the second plurality of components;

automatically generating, on the mobile computing device and without further user input, a new document of the selected presentation document or word processing document that is pre-populated with the selected component as an object having a type corresponding to the component as classified by the second set of machine learning models; and adding, by the mobile computing device, the component to a component data store with a type of the component, the type of the component based on an output of the second set of machine learning models.

2. The computer-implemented method of claim 1, further comprising:

overlaying on the presented content, an intelligent copy element;

receiving a selection of the intelligent copy element; and in response to receiving the selection, performing the highlighting.

3. The computer-implemented method of claim 2, wherein the component is a first component and wherein the method further comprises:

receiving a user input selecting a second component of the plurality of components; and in response to receiving the user input selecting the second component, updating the intelligent copy element to indicate two components were selected.

4. The computer-implemented method of claim 3, further comprising, in further response to receiving the user input selecting the second component:

overlaying on the presented content a set of control elements with respect to the first component and the second component;

receiving a selection of a document creation control element of the set of control elements; and in response to receiving the selection of the document creation control element;

presenting a set of document types.

5. The computer-implemented method of claim 4, further comprising:

in response to the selection of a document type of the set of document types:

generating a new document of the document type; and presenting representations of the first component and the second component in a selection interface.

6. The computer-implemented method of claim 3, wherein the first component is a text element type and the second component is an image component type.

7. The computer-implemented method of claim 1, wherein classifying, using the first set of machine learning models, by the mobile computing device, the presented content into the plurality of components includes:
transforming the presented content into an image file; and
inputting the image file into the first set of machine learning models.

8. The computer-implemented method of claim 1, further comprising:
receiving a selection of one at least a text or an image from the updated highlighting; and
generating a text document or a presentation slide document based on the selection of the text or the image.

9. A system comprising:
at least one processor; and
a storage device comprising instructions, which when executed by the at least one processor, configure the at least one processor to perform operations comprising:
presenting content of an electronic document on a mobile computing device within a mobile version of a computing application;
classifying, using a first set of machine learning models, by the mobile computing device, the content into a plurality of components;
generating, at the mobile computing device, metadata based on the classifying the content into the plurality of components;
transmitting the metadata to a server having a second set of machine learning models, results of the server taking precedence over the results of the mobile computing device in the metadata;
after the classifying, highlighting the plurality of components within the mobile version of the computing application;
receiving, from the server, a second classifying from the second set of machine learning models of the presented content into a second plurality of components;
updating the highlighting based on the second classifying;
surfacing, within the mobile version of the computing application, an intelligent-copy element that is selectable by a user;
receiving a user selection of the intelligent-copy element;
in response to the selection, presenting on the mobile version of the computing application an overlay slide-up interface that includes selectable options to create a presentation document or a word processing document using one or more selected components;
receiving a user selection of one of the selectable options;
receiving a user input selecting a component of the second plurality of components;
automatically generating, on the mobile computing device and without further user input, a new document of the selected presentation document or word processing document that is pre-populated with the selected component as an object having a type corresponding to the component as classified by the second set of machine learning models; and
adding, by the mobile computing device, the component to a component data store with a type of the component, the type of the component based on an output of the second set of machine learning models.

10. The system of claim 9, wherein the storage device further comprises instructions, which when executed by the at least one processor, configure the at least one processor to perform operations comprising:
overlaying on the presented content, an intelligent copy element;
receiving a selection of the intelligent copy element; and
in response to receiving the selection, performing the highlighting.

11. The system of claim 10, wherein the component is a first component and wherein the storage device further comprises instructions, which when executed by the at least one processor, configure the at least one processor to perform operations comprising:
receiving a user input selecting a second component of the plurality of components; and
in response to receiving the user input selecting the second component, updating the intelligent copy element to indicate two components were selected.

12. The system of claim 11, wherein the storage device further comprises instructions, which when executed by the at least one processor, configure the at least one processor to perform operations comprising:
in further response to receiving the user input selecting the second component:
overlaying on the presented content a set of control elements with respect to the first component and the second component;
receiving a selection of a document creation control element of the set of control elements; and
in response to receiving the selection of the document creation control element:
presenting a set of document types.

13. The system of claim 12, wherein the storage device further comprises instructions, which when executed by the at least one processor, configure the at least one processor to perform operations comprising:
in response to the selection of a document type of the set of document types:
generating a new document of the document type; and
presenting representations of the first component and the second component in a selection interface.

14. The system of claim 11, wherein the first component is a text element type and the second component is an image component type.

15. The system of claim 9, wherein classifying, using the first set of machine learning models, by the mobile computing device, the presented content into the plurality of components includes:
transforming the presented content into an image file; and
inputting the image file into the first set of machine learning models.

16. The system of claim 9, wherein the storage device further comprises instructions, which when executed by the at least one processor, configure the at least one processor to perform operations comprising:
receiving a selection of one at least a text or an image from the updated highlighting; and
generating a text document or a presentation slide document based on the selection of the text or the image.

17. A computer-readable medium comprising instructions, which when executed by at least one processor, configure the at least one processor to perform operations comprising:
presenting content of an electronic document on a mobile computing device within a mobile version of a computing application;

classifying, using a first set of machine learning models, by the mobile computing device, the content into a plurality of components;

generating, at the mobile computing device, metadata based on the classifying the content into the plurality of components;

transmitting the metadata to a server having a second set of machine learning models, results of the server taking precedence over the results of the mobile computing device in the metadata;

after the classifying, highlighting the plurality of components within the mobile version of the computing application;

receiving, from the server, a second classifying from the second set of machine learning models of the presented content into a second plurality of components;

updating the highlighting based on the second classifying;

surfacing, within the mobile version of the computing application, an intelligent-copy element that is selectable by a user;

receiving a user selection of the intelligent-copy element;

in response to the selection, presenting on the mobile version of the computing application an overlay slide-up interface that includes selectable options to create a presentation document or a word processing document using one or more selected components;

receiving a user selection of one of the selectable options;

receiving a user input selecting a component of the second plurality of components;

automatically generating, on the mobile computing device and without further user input, a new document of the selected presentation document or word processing document that is pre-populated with the selected component as an object having a type corresponding to the component as classified by the second set of machine learning models; and adding, by the mobile computing device, the component to a component data store with a type of the component, the type of the component based on an output of the second set of machine learning models.

18. The computer-readable medium of claim 17, wherein the instructions, which when executed by the at least one processor, further configure the at least one processor to perform operations comprising:

overlaying on the presented content, an intelligent copy element;

receiving a selection of the intelligent copy element; and in response to receiving the selection, performing the highlighting.

19. The computer-readable medium of claim 18, wherein the component is a first component and wherein the instructions, which when executed by the at least one processor, further configure the at least one processor to perform operations comprising:

receiving a user input selecting a second component of the plurality of components; and in response to receiving the user input selecting the second component, updating the intelligent copy element to indicate two components were selected.

20. The computer-readable medium of claim 19, wherein the instructions, which when executed by the at least one processor, further configure the at least one processor to perform operations comprising:

in further response to receiving the user input selecting the second component:

overlaying on the presented content a set of control elements with respect to the first component and the second component;

receiving a selection of a document creation control element of the set of control elements; and in response to receiving the selection of the document creation control element:

presenting a set of document types.

* * * * *